Patented May 6, 1924.

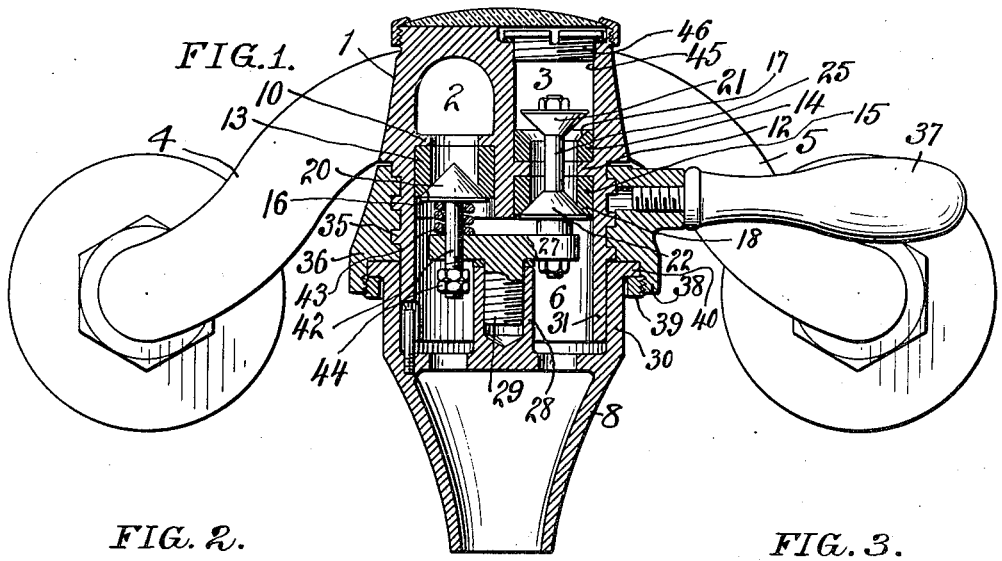

1,493,031

UNITED STATES PATENT OFFICE.

JULIUS GLANZBERG, OF PHILADELPHIA, PENNSYLVANIA.

MIXING VALVE.

Application filed April 11, 1923. Serial No. 631,279.

*To all whom it may concern:*

Be it known that I, JULIUS GLANZBERG, a citizen of the United States, residing at Philadelphia, in the county of Philadelphia and State of Pennsylvania, have invented certain new and useful Improvements in a Mixing Valve, of which the following is a specification.

My invention relates to improvements in a mixing valve, particularly adapted for controlling the flow of hot or cold water, and for mixing them for regulating the temperature of the water.

The object of my invention is to provide a mixing valve which is so constructed that it will entirely shut off the flow of water and prevent leakage, especially after the parts have become worn due to constant use; a further object of my invention is to provide a mixing valve having two passageways formed therein and valves for controlling the passageways, comprising an arrangement of the operating parts by which one of the valves will seat by means of a positive movement, and the other one will seat by a yielding movement of the operating part thus eliminating the necessity of accurately adjusting two valves for tightly closing the two passageways through the mixing valve.

Referring to the accompanying drawing, Figure 1 is a central vertical sectional view through the body of the valve, showing the parts in the closed position; Fig. 2, is a view similar to Fig. 1, showing the parts in the position to allow the cold water only to flow; Fig. 3, is a view similar to Figs. 1 and 2, with the valves in the position to allow the hot water only to flow; and Fig. 4, is a plan view of the valve body.

In the occompanying drawing, in which like reference characters refer to like parts, 1 represents the body portion having passageways 2 and 3 formed therein for the admission of hot and cold water, respectively. Said passageways communicate with the supply pipes 4 and 5 and with a common mixing chamber 6, formed in the lower portions of the body 1, on which latter is movably mounted the discharge pipe 8.

The body portion 1 is provided with flanges 10 and 12, located within the passageways 2 and 3. Said flanges 10 and 12 form stops, or shoulders, against which rest the rings, or sleeves, 13, 14 and 15. Said sleeves are provided with conical valve seats 16, 17, and 18, respectively, against which valve seats the valves 20, 21, and 22 are adapted to seat.

The valve sleeves 14 and 15 are positioned in the passageway 3, and at opposite sides of the flange 12. The conical valve seats 17 and 18 are opposed to each other and are in axial alignment. Said valves 21 and 22 are mounted upon the valve stem 25 and the conical valves 21 and 22 are so spaced upon the stem 25 that they will open and close alternately upon the valve seats 17 and 18 when the valve stem is moved longitudinlly.

The valves are mounted upon the bearing 27, which in turn is adjustably mounted upon a support 28, by means of a screw threaded shaft 29, formed upon the bearing 27. The said support 28 is mounted upon and is movable with the discharge pipe 8. The discharge pipe 8 is provided with a cylindrical portion 30, which is slidably mounted upon a sleeve, or shank 31, forming part of the body 1. The cylindrical portion 30 is fitted tightly upon the sleeve 31 so as to prevent leakage due to back pressure in the discharge. Said discharge pipe is prevented from turning on the sleeve 31 by a pin 32, secured in the said discharge pipe, and occupying a longitudinal slot 33 formed in the sleeve 31.

The sleeve 31 is provided with a screw threaded portion 35 on which is rotatably mounted a nut, or collar, 36, having mounted thereon an operating handle 37. The collar 36 is held in operative engagement with the discharge pipe 8 by a depending flange 38 on the collar 36 adapted to receive a threaded ring 39, which engages an annular flange 40, on the discharge pipe 8. By this arrangement the discharge pipe 8 is moved longitudinally upon the sleeve 31, when the collar 36 is rotated, and the valves are thus moved to and from the valve seats, as the handle 37 is moved into the various positions.

The valve 20, for controlling the flow of hot water, is mounted upon a valve stem 42, which extends loosely through a hole formed in the bearing 27. A spring 43 tends to move the valve 20 away from the bearing 27 and this movement of the valve 20 is limited by the adjusting nuts 44 which form a stop upon the valve stem 42.

When the handle 37 is in the "Off" position, as shown in Figs. 1 and 4, the collar 36 will have been turned so as to bring the discharge pipe 8 and the bearing 27 into a position to close the valves 20 and 22, thus shutting off the flow of water through the passageways 2 and 3. The valve 20 seats before the valve 22 seats, during the upward movement of the bearing 27, which is carried by the discharge pipe 8. The spring 43 is compressed when the valve 20 comes in contact with the valve seat 16, and the bearing 27 continues to move upwardly until the valve 22 is seated by a positive movement of the bearing 27 and the operating parts associated therewith. The valve stem 42 is slidably mounted in the bearing 27, which permits the valve 22 to have a greater movement than the valve 20. The valve 21, which is mounted upon the same valve stem 25 as the valve 22, is in the open position when the passageway 3 is closed by the valve 22. When the handle 37 is turned into the position marked "Cold" in Fig. 4, the valves will be moved into the positions shown in Fig. 2, with the valves 21 and 22 open and allowing the cold water to flow through passageway 3. The valve 20 remains in the closed position due to the stem 42 being slidably mounted in the bearing 27, which permits the spring 43 to hold the valve 20 against the valve seat 16.

A further movement of the handle 37 towards the portion of the valve body marked "Warm," in Fig. 4, will cause the bearing 27 to take against the stop 44 and move the valve 20 away from the seat 16 and thus allow the hot water to flow through passageway 2. A still further movement of the handle 37 will cause the valve 20 to gradually open wider and the valve 21 to gradually close, thus allowing more hot water and less cold water to flow through the passageways 2 and 3, respectively, and a still further movement of the handle 37 will fully open the valve 20 and close the valve 21, thus allowing only hot water to flow.

By constructing the mixing valve so that one valve may be held closed by a yielding member and the other valve closed by a positive movement of the operating parts, the necessity of accurately adjusting two valves to properly seat at the same time is eliminated. By constructing the body portion with an opening 45 at the top of passageway 3, the parts may be readily assembled. Said opening is closed by a plug 46 after the valve 21 and the valve sleeve associated therewith have been inserted.

Having thus described my invention I claim and desire to secure by Letters Patent:

1. A mixing valve comprising a body portion having two passageways formed therethrough, a discharge pipe mounted upon the body portion, two valve seats positioned within one of said passageways, valves adapted to alternately engage said valve seats when moved in opposite directions, a part operatively mounted within the body portion upon which said valves are rigidly mounted, a valve seat positioned within the other one of said passageways, a valve adapted to engage the last mentioned valve seat, a yielding member tending to hold the last mentioned valve in the closed position, and said operating part adapted to engage and move said last mentioned valve conjointly with the first mentioned valves throughout a portion of the movement of said operating part.

2. A mixing valve comprising a body portion having two passageways formed therethrough, a discharge pipe associated with the body portion, valve seats located within said passageways, valves adapted to engage said valve seats, valve stems upon which said valves are mounted, a part operatively mounted in relation to said valve seats, said part having one of said valve stems secured thereon, said part having the other one of said valve stems slidably mounted thereon, a spring upon said last mentioned valve stem tending to move said valve stem in relation to said part in the direction of the valve seat located adjacent thereto, and a stop upon said last mentioned valve stem adapted to be engaged by said part and limit the movement of the spring.

3. A mixing valve comprising a body portion, a cylindrical shank forming part of the body portion, a discharge pipe movable longitudinally upon the shank, said body portion having passageways formed therein, valve seats upon the body portion located in said passageways, valves mounted upon and movable with the discharge pipe adapted to engage the valve seats in one of said passageways, a second valve yieldingly mounted upon the discharge pipe adapted to engage the valve seat located in the other one of said passageways, and engaging means associated with the discharge pipe and the last mentioned valve adapted to move the latter valve at a predetermined time in the movement of the discharge pipe.

4. A mixing valve comprising a body portion having two passageways formed therethrough, a discharge pipe mounted upon the body portion, two valve seats upon the body portion located within one of said passageways, a valve stem movably mounted upon the body portion in alignment with said valve seats, two conical valves mounted upon said stem positioned with their apices adjacent to each other and adapted to alternately seat upon either of said valve seats, another valve seat upon the body portion located within the other one of said passageways, a valve adapted to seat upon the last mentioned valve seat, a spring tending to hold the last mentioned valve in the closed position, and a part operatively mounted within the body portion upon which the stem carrying the two valves is rigidly mounted, and said part adapted to engage the said valve supported by the spring and move it into the open position at a predetermined time in the movement of the first mentioned valves.

5. A mixing valve comprising a body portion having two inlet passageways formed therein, a common discharge pipe, a cylindrical shank upon the body portion, a sleeve upon the discharge pipe adapted to have a close sliding fit upon said shank, a collar rotatably mounted upon the body portion adapted to impart a longitudinal movement of the discharge pipe upon said shank, and valves operatively mounted upon the discharge pipe adapted to regulate the flow of liquid through the said two passageways formed through the body portion.

6. A mixing valve comprising a body portion having two inlet passageways formed therein, a discharge pipe slidably mounted upon the body portion, a collar rotatably mounted upon the body portion adapted to impart a longitudinal movement to the discharge pipe, annular flanges upon the body portion located in each inlet passageway, removable sleeves having valve seats formed thereon supported within the body portion by said flanges, valves adapted to seat upon said valve seats formed upon the sleeves, valve stems upon which said valves are mounted and a support upon the discharge pipe upon which said valve stems are mounted.

7. A mixing valve comprising a body portion having two passageways formed therein, a cylindrical portion formed upon the body portion, a discharge pipe having a cylindrical portion movably mounted upon the cylindrical portion of the body, a collar adapted to engage a screw thread formed upon the body portion and move the discharge pipe longitudinally upon the body portion, a support formed upon the discharge pipe, a bearing upon said support, a valve stem secured upon said bearing, two conical valves mounted upon the valve stem, valve seats positioned upon the body portion within one of said passageways adapted to be alternately closed by said valves when the latter are moved in opposite directions, a valve seat upon the body portion within the other one of said passageways, a valve stem slidably mounted upon said bearing, a conical valve mounted upon the last mentioned valve stem adapted to engage said last mentioned valve seat, a spring adapted to yieldingly support said last mentioned valve upon said bearing, and a stop to limit the movement of said spring.

In testimony whereof I affix my signature.

JULIUS GLANZBERG.